United States Patent [19]

Meister et al.

[11] Patent Number: 5,302,196
[45] Date of Patent: Apr. 12, 1994

[54] MODIFIED CELLULOSE ETHERS AND THE USE THEREOF IN DISPERSION PAINTS

[75] Inventors: Christoph Meister, Wiesbaden; Reinhard Dönges, Bad Soden am Taunus; Walter Schermann, Mainz; Walter Schrattenholz, Schnorbach, all of Fed. Rep. of Germany

[73] Assignee: Hoechst Aktiengesellschaft, Frankfurt, Fed. Rep. of Germany

[21] Appl. No.: 756,821

[22] Filed: Sep. 9, 1991

[30] Foreign Application Priority Data

Sep. 11, 1990 [DE] Fed. Rep. of Germany ....... 4028746

[51] Int. Cl.$^5$ .................. C09D 101/32; C09D 101/26; C08L 01/32; C08L 01/26
[52] U.S. Cl. ................................. 106/197.1; 106/171; 106/190; 536/66; 536/90; 536/91
[58] Field of Search .................... 106/171, 190, 197.1; 536/66, 90, 91

[56] References Cited

U.S. PATENT DOCUMENTS

| 2,115,708 | 5/1938 | Dreyfus | 106/190 |
|---|---|---|---|
| 2,518,203 | 8/1950 | Thompson | 536/66 |
| 4,749,414 | 6/1988 | Wu et al. | 106/190 |
| 4,904,772 | 2/1990 | Sau | 536/90 |

FOREIGN PATENT DOCUMENTS

| 59-129201 | 7/1984 | Japan | 536/66 |
|---|---|---|---|
| 61-171702 | 8/1986 | Japan | 536/66 |
| 2558809 | 7/1976 | United Kingdom | 536/66 |

*Primary Examiner*—David Brunsman
*Attorney, Agent, or Firm*—Connolly and Hutz

[57] ABSTRACT

The invention relates to water-soluble cellulose ethers, containing at least one fluorine-free radical attached via an ether link and selected from the group hydroxyethyl, hydroxypropyl, methyl, ethyl and carboxymethyl, and a hydrophobic substituent which comprises one fluorine-containing alkyl radical of 3 to 24, in particular 5 to 18, carbon atoms, the fluorine content being 0.05 to 5, in particular 0.1 to 1% by weight, based on the dry weight of the cellulose ether.

16 Claims, No Drawings

MODIFIED CELLULOSE ETHERS AND THE USE THEREOF IN DISPERSION PAINTS

Modified cellulose ethers and the use thereof in dispersion paints.

The invention relates to water-soluble cellulose ethers, to the use thereof and to the dispersion paint which contains this compound.

When commercial cellulose ethers, hydrophobically modified by long-chain alkyl groups, are used as thickeners in dispersion paints, undesirably high post-thickening takes place on storage. The consistency of the dispersion paint increases strongly after its preparation and can more than double in one day's storage. For this reason any controlled adjustment/monitoring of the paint consistency becomes difficult for the paint manufacturer. An important drawback of these cellulose ethers hydrophobically modified by long-chain alkyl groups lies in the fact that dispersion paints thickened with these products spray distinctly less on processing only at a relatively high paint consistency of at least 25000-32000 mpa.s (Brookfield rheometer, spindle 6 at 10 rpm) than paints prepared with non-hydrophobically modified cellulose ethers. High paint viscosities also have an unfavorable effect on the brushability and flow-out of the paints.

The object of the invention is to provide water-soluble, hydrophobically modified cellulose derivatives which, when used in dispersion paints, cause only a slight post-thickening, comparable with non-hydrophobically modified cellulose ethers, and at the same time enhance their splashing characteristics, when the paint is roller-applied, to an extent such as that only achieved with commercial cellulose ethers hydrophobically modified by long-chain alkyl groups. In addition, the invention is intended to make available cellulose derivatives which, when used in dispersion paints, considerably enhance the splashing characteristics of the latter even at relatively low viscosities; on the other hand the paint must be readily brushable.

This object is achieved according to the invention by the cellulose ethers possessing the features stated in claim 1 and by the dispersion paint possessing the features stated in claim 6. The dependent claims indicate expedient further developments.

The invention further relates to the use of the cellulose ether according to claim 8.

The molecular basic framework of the cellulose derivative is comprised of the known linear polymer of anhydroglucose units. The number of OH groups etherified by the non-hydrophobic substituents per anhydroglucose unit is expressed by the average degree of substitution; the number of units of the non-hydrophobic etherification agent added per anhydroglucose unit is expressed by the molar degree of substitution. The degrees of substitution for the compound of the invention lie in the normal range for cellulose ethers. For example, the molar degree of substitution for the hydroxyethyl group in hydroxyethylcellulose is 1.5 to 4.0, in particular 2.0 to 3.0. The amount of non-hydrophobic substituents is not critical, as long as it is sufficient to ensure the desired water-solubility of the cellulose derivative.

The cellulose derivatives according to the invention are water-soluble cellulose ethers comprising a non-hydrophobic substituent and additionally a hydrophobic substituent which contains a fluorine-containing, branched or unbranched alkyl chain of 3-24, in particular 5-18, carbon atoms. The fluorine-containing substituent preferably contains at least 2, in particular at least 3, carbon atoms attached to fluorine atoms.

The amount of these hydrophobic substituents is comparatively small and corresponds to a fluorine content in the range of 0.05-5, preferably 0.1-1% by weight, based on the dry weight of the cellulose derivative. The fluorine content is determined in the following manner: The product is completely freed from salts and any adsorptively bound fluorine-containing impurities using an aqueous organic and then an organic extractant and is dried at 110° C. for 10 hours. The sample is combusted by the method of Schöniger, the resultant hydrofluoric acid is absorbed in water and analyzed using an ion-selective electrode (reference: W. Schöniger, Mikrochim. Acta (1955/1, 123 ff)).

In addition to the fluorine-containing substituent or substituents, the cellulose derivatives comprise one or more non-hydrophobic substituents containing a fluorine-free radical, attached to the cellulose via an ether link, selected from the group hydroxyethyl, hydroxypropyl, methyl, ethyl and carboxymethyl. The amount of these non-hydrophobic substituents is regulated in such a way that, depending on the application, adequate water-solubility of the cellulose derivative is ensured. Cellulose derivatives of adequate water-solubility have a solubility of at least 0.5% by weight in water (20° C.).

The preferred radical of the fluorine-free, nonhydrophobic substituent is hydroxyethyl. The average degree of polymerization of the cellulose derivatives according to the invention is about 50-2000, in particular 400-1200.

In contrast to the cellulose ethers hydrophobically modified by long-chain fluorine-free alkyl groups and used hitherto in dispersion paints, the 1-2% aqueous solutions of the cellulose ether derivatives according to the invention show practically no associative thickening on account of their low content of hydrophobic fluorine-containing substituents. They behave in aqueous solution as the corresponding non-modified cellulose ethers.

The modified fluorine-containing alkyl radicals can be attached to the cellulose substrate via an ether, ester or urethane link. The ether link is preferred, for this is usually the most stable one toward other reactions, for example the hydrolytic cleavage of the cellulose basic framework.

Methods for the preparation of mixed fluorine-free cellulose ethers, i.e. of products containing more than one modifying, etherifying, fluorine-free radical on the same cellulose molecule, are known in the art. The preparation of the cellulose derivatives of the invention is carried out in the same manner as the method described for mixed, fluorine-free cellulose ethers or by combining the corresponding methods for the preparation of cellulose ethers containing non-hydro phobic radicals with the known preparation of cellulose derivatives containing exclusively fluorine-containing substituents.

Accordingly, the introduction of the fluorine-containing substituents can be carried out either before or after or simultaneously with the introduction of the hydroxyethyl, hydroxypropyl, methyl, ethyl and/or carboxymethyl ether groups. A fluorine-free cellulose ether selected from the group hydroxyethyl-, hydroxypropyl-, methyl-, ethyl- or carboxymethylcellulose or one of their mixed ethers is preferably prepared first by known methods. This is then reacted, either with or without intermediate isolation, in the presence of bases, for example aqueous alkali metal hydroxides, aqueous alkaline earth metal hydroxides, quaternary ammonium hydroxides or tertiary amines such as pyridine, triethylamine or tripropylamine, with the fluorine-containing reagents. The bases act both as a catalyst for the reaction with the fluorine-containing reagent and as a swelling agent for the cellulose substrate. This ensures that the fluorine-containing reagents react simultaneously with practically all of the cellulose ether molecules. The reaction is preferably carried out in an inert diluent. Examples of such suitable diluents are lower alcohols such as isopropanol and tert-butanol, ketones such as acetone, aromatic and aliphatic hydrocarbons such as toluene or the fluorine-containing reagent itself, used in excess. The reaction is normally carried out in a temperature range of 20° to 100° C. At the end of the reaction the residual base is neutralized, the product is isolated, washed, if desired, with aqueous organic and/or organic solvents and then dried. The cellulose derivatives in their end product form are either granules or a powder and usually have a residual moisture content of below 10%.

Examples of suitable fluorine-containing reagents for the formation of an ether link between the cellulose and the fluorine-containing substituent are alkylene oxides containing a fluoroalkyl radical, fluoroolefins, fluorine-containing haloalkanes, fluorine-containing halohydrins, glycidyl ethers of fluoroalcohols as well as Michael systems such as fluorine-containing acrylonitrile and acrylic ester derivatives.

Alkylene oxides containing a fluoroalkyl radical for the formation of an ether link have the formula

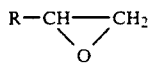

in which R is an alkyl radical having 3 to 22, in particular 3 to 16 carbon atoms, at least 3 carbon atoms being fluorinated.

These compounds react to form cellulose derivatives of the formula

R—CH(OH)—CH$_2$—O—cellulose ether. (a)

Fluorine-containing halohydrins have the formula

R—CH(OH)—CH$_2$Cl(Br), in which R has the same meaning. They react in the presence of bases to form alkylene oxide with cleavage of HCl or HBr and this oxide reacts to form the cellulose derivative in the same manner as described above.

Fluoroolefins are fluorine-containing hydrocarbons

R—CF=CF—R$^1$ containing a total of 3-24, in particular 5-18, carbon atoms and at least one double bond, at least the carbon atoms of a double bond and a third carbon atom being fluorinated. R and R$^1$ are alkyl radicals.

Cellulose derivatives of the following formula are obtained cellulose ether—O—CFR—CHFR$^1$ or (b)

cellulose ether—O—CFR$^1$—CHFR. (c)

Fluorine-containing haloalkanes are comprised of saturated hydrocarbons RX containing at least 3 fluorinated carbon atoms in the alkyl radical R and a carbon atom carrying a chlorine, bromine or iodine atom (=X). The total number of the carbon atoms is 3 to 24, in particular 5 to 18. The cellulose derivative has the formula cellulose ether—O—R. (d)

Glycidyl ethers of fluoroalcohols have the formula

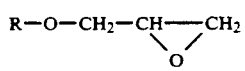

in which R is an alkyl radical having 3 to 21, in particular 3 to 15, carbon atoms. The compound contains at least 3 fluorinated carbon atoms. The resultant cellulose derivative has the formula cellulose ether—O—CH$_2$—CH(OH)—CH$_2$—OR. (e)

Fluorine-containing acrylonitriles and acrylic esters have the formulae $CX_2=CX-Y$ $R^2CX=CX-Y$ in which X is hydrogen and/or fluorine. R$^2$ is either H or an alkyl radical having 1 to 22, in particular 3 to 16 carbon atoms, Y is —CN or —CO$_2$R$^3$, R$^3$ being an alkyl group having 1 to 22, in particular 3 to 16, carbon atoms.

These compounds contain at least 3 fluorine-containing carbon atoms.

They react to form cellulose ether—O—CX$_2$—CHX—Y or (f)

cellulose ether—O—CXR$^2$—CHX—Y. (g)

The introduction of the fluorine-containing radical into cellulose or cellulose ethers via an ether link of the fluorinated group is carried out under similar reaction conditions as in the known preparation of cellulose ethers containing various fluorine-free radicals. Cellulose or woodpulp is used as starting material and the fluorine-free radical and the fluorine-containing radical are introduced by reaction with a hydroxyl group of the cellulose in a basic medium either successively or simultaneously.

The introduction of fluorine-containing substituents via an ester or urethane link use practically the same methods as those used in the formation of an ether link with the fluorine-containing reagents. Examples of suitable fluorine-containing reagents for the formation of an ester or urethane link are fluoroalkylene oxides, fluorine-containing ketenes, fluorine-containing carbonyl halides, in particular chlorides and bromides, and fluorine-containing isocyanates.

Fluoroalkylene oxides for the formation of an ester link have the formula $$R-CF\underset{O}{\overline{\phantom{xx}}}CF_2$$

in which R is an alkyl radical having 1 to 24, in particular 5 to 18, carbon atoms. Fluorine atoms are attached to at least 2, preferably at least 3, carbon atoms of this compound. These compounds react to form cellulose derivatives of the formula (h)

$$RCF_2-CF_2-O(CFR-CF_2-O)_n-CFR-CO-O-\text{cellulose ether} \qquad (h)$$

$$n=0-3$$

or $$R-CF_2-CO-O-\text{cellulose ether}. \qquad (i)$$

Fluorine-containing ketenes have the structure $$\begin{array}{c}R\\ \phantom{R^2}\diagdown\\ \phantom{xxx}C=C=O\\ \phantom{R}\diagup\\ R^2\end{array}$$

in which $R^2$ is a hydrogen atom or a fluorine-containing alkyl radical, R is a fluorine-containing alkyl radical, R and $R^2$ have a total of 2 to 24 carbon atoms with at least 2, preferably at least 3, carbon atoms being fluorinated. These compounds react to form cellulose derivatives of the formula $$HCRR^2-CO-O-\text{cellulose ether}. \qquad (j)$$

Fluorine-containing carbonyl halides R—COX (X=Cl, Br) contain one fluorinated alkyl group having 3 to 24, in particular 5 to 18, carbon atoms with at least 2, preferably at least 3, carbon atoms being fluorinated. They react to form cellulose derivatives of the formula $$R-CO-O-\text{cellulose ether}. \qquad (k)$$

Fluorine-containing isocyanates have the formula $$R-N=C=O,$$

in which R is a fluorinated alkyl group having 3 to 24, in particular 5 to 18, carbon atoms with at least 2, preferably at least 3, carbon atoms being fluorinated.

They react to form $$R-NH-CO-O-\text{cellulose ether}. \qquad (l)$$

The presence of bases is essential for the reaction of these fluorine-containing reagents with cellulose or cellulose ethers to form an ester or urethane link, as it is for the formation of an ether link. The bases ensure that the cellulose or cellulose ethers swell sufficiently prior to the reaction with the fluorine-containing reagent, so that the modifying fluorine-containing reagents can react practically uniformly with all cellulose or cellulose ether molecules. If the reaction is not carried out substantially uniformly, the goal of enhancement of the application properties is not achieved.

Examples of suitable reaction equipment for the preparation of the cellulose ether derivatives according to the invention are a stirred reaction vessel, a mixer and a kneader. Basically any reaction equipment can be used which is also customary for use in the preparation of cellulose derivatives containing non-hydrophobic substituents and allows adequate mixing of the cellulose or of the water-soluble cellulose ether with the non-hydrophobic reagents.

The invention is elucidated in greater detail by the following examples. All percentages are percentages by weight. The following fluorine-containing reagents are used:

$$C_6F_{13}CH_2-CH\underset{O}{\overline{\phantom{xx}}}CH_2 \qquad (1)$$

$$C_8F_{17}CH_2-CH\underset{O}{\overline{\phantom{xx}}}CH_2 \qquad (2)$$

$$C_{10}F_{21}C_2H_4OCH_2-\underset{\underset{CH_2Cl}{|}}{CH}-O-CH_2-CH\underset{O}{\overline{\phantom{xx}}}CH_2 \qquad (3)$$

$$C_7F_{15}CH_2Br \qquad (4)$$

$$CF_3-CF=CF_2 \qquad (5)$$

$$C_5F_{11}-CF=CF_2 \qquad (6)$$

Example 1

60 g of air-dried fir woodpulp are suspended in a mixture of 586.4 g of 95% tert-butanol and 60 g of isopropanol. The suspension is transferred to a 2 l autoclave and rendered inert by evacuation and a blanket of nitrogen; a solution of 15.35 g of sodium hydroxide in 45 g of water is added dropwise with stirring. Stirring is continued for 30 min at room temperature, after which 94.6 ml of ethylene oxide are added to prepare hydroxyethylcellulose. The reaction is then allowed to proceed for 2 hours at 40° C., the reaction mixture is partly neutralized with 30.43 g of 65% nitric acid and the reaction is allowed to proceed to completion over 2 hours at 80° C. 0.8 g of the alkylene oxide of the formula (1) is added and the reaction is allowed to proceed for a further 6 hours at 90° C. The reaction mixture is then cooled, neutralized with 4.6 g of acetic acid, extracted with 80% acetone until free from salts, dewatered with 1 l of acetone, washed with two 1 l portions of petroleum spirit and the product is dried at 60° C.

The hydroxyethylcellulose derivative has a molar degree of substitution of 4.0 and a fluorine content of 0.09%. Its viscosity in a 2% aqueous solution is 9300 mpa.s.

Example 2

70 g of air-dried hydroxyethylcellulose with a molar degree of substitution of 2.4 and a viscosity of 5600 mpa.s in a 2% aqueous solution are suspended in 371 g of 95% tert-butanol. The suspension is transferred to a 2 l autoclave and rendered inert by evacuation and a blanket of nitrogen; a solution of 2 g of sodium hydroxide in 26.2 g of water is added with stirring. Stirring is continued for 30 min at room temperature, after which 5.9 g of the alkylene oxide of the formula (2) are added. The reaction is allowed to proceed for 6 hours at 90° C., the reaction mixture is then cooled, neutralized with 3.3 g of acetic acid and worked up as in Example 1.

The hydroxyethylcellulose derivative has a fluorine content of 0.29% and a viscosity in a 2% aqueous solution of 3800 mPa.s.

Example 3

The reaction is carried out with 8.8 g of the alkylene oxide of the formula (3) instead of the alkylene oxide of the formula (2), using the same procedure as in Example 2. The resultant hydroxyethylcellulose derivative has a fluorine content of 0.16% and a viscosity in a 2% aqueous solution of 2400 mpa.s.

Example 4

The reaction is carried out with 3.1 g of the alkylene oxide of the formula (2) in 371 g of 77% isopropanol, using the same procedure as in Example 2. The hydroxyethylcellulose derivative has a fluorine content of 0.35% and a viscosity in a 2% aqueous solution of 5100 mpa.s.

Example 5

60 g of air-dried fir pulp are suspended in 500 g of tert-butanol, 31 g of acetone and 50 g of water. The suspension is transferred to a 2 l autoclave and rendered inert by evacuation and a blanket of nitrogen; a solution of 23.8 g of sodium hydroxide in 46.6 g of water is added, stirring is continued for 30 min at room temperature, 34.8 ml of ethylene oxide are added and the reaction is allowed to proceed for 45 min at 55° C. A further portion of 52.2 ml of ethylene oxide as well as 4.1 g of the bromide of the formula (4) are then added and the reaction is allowed to proceed for 45 min at 70° C. and at 2.5 hours at 95° C. The reaction mixture is cooled to 70° C., 14.1 g of monochloroacetic acid in 34.5 g of tert-butanol are added and the reaction is allowed to proceed for a further 1 hour at 70° C. The reaction mixture is then cooled, neutralized with 29 g of 65% nitric acid and 1.7 g of acetic acid and worked up as in Example 1.

The hydroxyethylcarboxymethylcellulose derivative has a molar degree of substitution with hydroxyethyl of 2.7 and an average degree of substitution with carboxymethyl of 0.25. Its fluorine content is 0.32%. The viscosity of the 2% aqueous solution is 20100 mpa.s.

Example 6

70 g of air-dried methylhydroxyethylcellulose having an average degree of substitution of 1.4 with methyl and a molar degree of substitution of 0.14 with hydroxyethyl and a viscosity of 2600 mPa.s in a 2% aqueous solution are suspended in 300 g of 95% tert-butanol. The suspension is transferred to a 2 l autoclave and rendered inert by evacuation and a blanket of nitrogen; a solution of 2.4 g of sodium hydroxide in 38.8 g of water is added dropwise with stirring, stirring is continued for 30 min at room temperature and a solution of 1.5 g of the perfluoroolefin of the formula (5) in 20 g of tertbutanol is added. The reaction is then allowed to proceed for 6 hours at 90° C. The reaction mixture is cooled, neutralized with 4 g of acetic acid and worked up as in Example 1.

The methylhydroxyethylcellulose derivative has a fluorine content of 0.6% and a viscosity in a 2% aqueous solution of 1870 mPa.s.

Example 7

The reaction is carried out with 2.6 g of the perfluoroolefin of the formula (6), using the same procedure as in Example 6. The resultant methylhydroxyethylcellulose derivative has a fluorine content of 0.4% and a viscosity in a 2% aqueous solution of 2100 mPa.s.

The cellulose derivatives prepared in Examples 2 and 3 are incorporated as thickeners in an interior dispersion paint and their effect is compared with the thickeners of the present state of the art.

The examined dispersion paints have the following stock formulation:

| Parts by weight | Components |
| --- | --- |
| 123 | Water |
| 16 | Preservative |
| 10 | Polyphosphate (10% Calgon ® N), from Hoechst, DE |
| 5 | Dispersant (Additol ® XW 330), from Hoechst, DE |
| 1 | Antifoam (Agitan ® 280), from Münzing-Chemie, DE |
| 100 | Titanium dioxide pigment |
| 375 | Filler (CaCO$_3$, Durcal ® 5), from Omnya GmbH, DE |
| 50 | Filler (CaCO$_3$, Socal ® P II), from Solvay GmbH, DE |
| 25 | China Clay (kaolin) |
|   | Styrene-acrylate copolymer dispersion (Mowilith ® DM 60) from Hoechst, DE |
| 1 | Sodium hydroxide (10%) |
| 792 | |
|   | Preparation of the finished paint: |
| 792 | Stock formulation |
| 8 | Film former (Texanol ®), from Eastman, USA. |
| 200 | Thickener (thickener as a 2 to 4% aqueous solution) |
| 1000 | |

Sample A: Thickener cellulose derivative of Example 2

Sample B: Thickener cellulose derivative of Example 3

The following thickeners of the present state of the art are used for comparison with the cellulose derivatives of the invention. All viscosities (mPa.s) of the thickeners were determined in a 2% aqueous solution at 20° C. according to DIN 53 015 in a Höppler falling ball viscometer.

Sample C: Thickener hydroxyethylcellulose, viscosity 6000 mPa.s/2%

Sample D: Thickener methylhydroxyethylcellulose, viscosity 6000 mPa.s/2%

Sample E: Thickener hydroxyethylcellulose with a long-chain alkyl radical, viscosity 6000 mPa.s/2%

Sample F: Thickener ethylhydroxyethylcellulose, hydrophobically modified, viscosity 6000 mPa.s/2%

Immediately after the preparation of the finished paint and after its conditioning for 1 day at 20° C. and 50% humidity, the paint viscosities were measured in a Brookfield rheometer (spindle 6 at 10 and 100 rpm, 20° C.).

It can been seen from the measured viscosities that less post-thickening of the products according to the invention (samples A and B) occurs compared with the cellulose ethers and the hydrophobically modified cellulose ethers normally used (samples E and F).

| | Brookfield viscosity (sp. 6/10 rpm) | | |
| --- | --- | --- | --- |
| Sample | directly after preparation | after 1 day's storage | Change (%) |
| A | 26500 mPa.s | 29000 mPa.s | +9.4 |
| B | 30600 | 36200 | +18.3 |
| C | 24500 | 36000 | +46.9 |
| D | 19000 | 25000 | +31.6 |

-continued

| Sample | Brookfield viscosity (sp. 6/10 rpm) | | Change (%) |
|---|---|---|---|
| | directly after preparation | after 1 day's storage | |
| E | 24000 | 40500 | +77.9 |
| F | 14000 | 36000 | +157.1 |

To assess the yield of the thickeners, conditioned dispersion paints having a reference viscosity of 25000 mPa.s (Brookfield rheometer, spindle 6, 10 rpm, measurement time 1 min, 20° C.) are used.

The products according to the invention show in comparison a higher yield. Thus, for the adjustment to the reference consistency the following amounts (% by weight based on the total weight of the paint) are required:

Sample A 0.44–0.50% by weight
Sample B 0.44–0.50% by weight
Sample C 0.55–0.60% by weight
Sample D 0.58–0.63% by weight
Sample E 0.50–0.55% by weight
Sample F 0.52–0.57% by weight The following test, which follows the application of the paint by a paint roller, is carried out to assess quantitatively the splashing characteristics of a dispersion paint:

A conditioned paint roller is loaded with a defined amount (35 ml) of a dispersion paint and rolled several times in motorized movements across a paint stripper screen customarily used in the industry. The pressure applied to the paint roller is kept constant. At the bottom of a dish which serves as support for the rectangular screen, is a black piece of cardboard. The number of splashes deposited on the cardboard and the area covered by them are quantitatively analyzed by means of a photoelectronic image analyzer.

| Sample | Results (paint splash test) Area covered with paint splashes (%) |
|---|---|
| A | 0.4–0.5 |
| B | 0.4–0.5 |
| C | 1.7–2.1 |
| D | 0.7–0.9 |
| E | 0.4–0.5 |
| F | 0.4–0.5 |

In the incorporation of the cellulose derivatives according to the invention into dispersion paints, the former show a comparable reduction in tendency to splashing compared with cellulose derivatives hydrophobically modified by long alkyl chains. They lead, however, to less post-thickening of the paint on storage and possess in respect of the thickening effect on the paint a higher yield and thus increased effectiveness. Compared with cellulose ethers without hydrophobic modification, the cellulose derivatives according to the invention achieve distinctly reduced splashing characteristics of the dispersion paint. Also, compared with these compounds, a smaller amount of thickener is required to achieve the desired paint consistency.

The cellulose derivatives are also suitable for use as protective colloids for suspension/emulsion polymerization and can also be employed as surface-active compounds.

What is claimed:

1. A water-soluble cellulose ether containing at least one fluorine-free radical attached via an ether link and selected from the group hydroxyethyl, hydroxypropyl, methyl, ethyl and carboxymethyl, and a hydrophobic substituent which comprises a fluorine-containing alkyl radical containing 3 to 24 carbon atoms, the fluorine content being 0.05 to 5, by weight, based on the dry weight of the cellulose ether wherein the hydrophobic substituent attached to the cellulose ether has one of the formulae selected from the group consisting of (a) R—CH(OH)—CH$_2$—O—cellulose ether
(b) R$^1$—CHF—CFR—O—cellulose ether
(c) R—CHF—CFR$^1$—O—cellulose ether
(d) R—O—cellulose ether
(e) R—O—CH$_2$—CH(OH)—CH$_2$—O—cellulose ether
(f) Y—CHX—CX$_2$—O—cellulose ether
(g) Y—CHX—CXR$^2$—O—cellulose ether
(j) HCRR$^2$—CO—O—cellulose ether
(l) R—NH—CO—O—cellulose ether in which R and R$^1$ are each a (C$_1$–C$_{22}$)alkyl radical and R$^2$ is either H or a (C$_1$–C$_{22}$)alkyl radical, the total number of the carbon atoms of the alkyl groups of the formulae (b), (c) and (j) being 3 to 24, X is fluorine and/or hydrogen and Y is —CN or —CO$_2$R$^3$, R$^3$ being a (C$_1$–C$_{22}$)alkyl radical, and in the formulae (a) to (g) at least 3 carbon atoms, in the formula (j) and (l) at least 2 carbon atoms, of the substituents are linked with fluorine atoms.

2. A cellulose ether as claimed in claim 1, wherein the average degree of polymerization of the cellulose ether is 50 to 2000.

3. A cellulose ether as claimed in claim 2 wherein the average degree of polymerization of the cellulose ether is 400 to 1200.

4. A cellulose ether as claimed in claim 1, the solubility of which in water being at least 0.5% by weight (20° C.).

5. A dispersion paint containing hydrophobically modified cellulose ethers added for the enhancement of the splashing characteristics of the paint, wherein the cellulose ether comprises one or more of the cellulose derivatives referred to in claim 1.

6. The dispersion paint as claimed in claim 5, wherein a small amount of the cellulose derivative is present in the paint, wherein said amount is less than 0.5% by weight based on the weight of the dispersion paint.

7. A process for the preparation of insoluble cellulose ethers according to claim 1, wherein a fluorine-free cellulose ether selected from the group hydroxyethyl-, hydroxypropyl-, methyl-, ethyl- or carboxymethylcellulose or one of their mixed ethers is reacted in the presence of bases with fluorine-containing reagents, optionally in an inert diluent.

8. The process for the preparation of water-soluble cellulose ethers as claimed in claim 7, wherein aqueous solutions of alkali metal hydroxides, alkaline earth metal hydroxides, quaternary ammonium hydroxides or tertiary amines are used as the bases.

9. The process for the preparation of water-soluble cellulose ethers as claimed in claim 7, wherein alkylene oxides containing a fluoroalkyl radical, fluoroolefins, fluorine-containing haloalkanes, fluorine-containing halohydrins, glycol ethers of fluoroalcohols and fluorine-containing acrylonitrile and acrylic ester derivatives are used as the fluorine-containing reagents.

10. The process for the preparation of water-soluble cellulose ethers as claimed in claim 7, wherein lower alcohols, ketones, aromatic hydrocarbons, aliphatic hydrocarbons or the fluorine-containing reagent itself are used as the inert diluent.

11. The process for the preparation of water-soluble cellulose ethers according to claim 7, wherein the reaction is carried out at a reaction temperature of 20° to 100° C.

12. A cellulose ether as claimed in claim 1 wherein the fluorine-containing alkyl radical contains 5 to 18 carbons.

13. A cellulose ether as claimed in claim 1 wherein fluorine content is from 0.1 to 1% by weight.

14. A thickener in dispersion paints comprising the cellulose derivatives as claimed in claim 1.

15. A cellulose ether as claimed in claim 1, wherein the average degree of polymerization of the cellulose ether is 400 to 1200.

16. The method of thickening a dispersion paint comprising the step of incorporating in a dispersion paint a cellulose derivative consisting of water-soluble cellulose ether containing at least one fluorine-free radical attached via an ether link and selected from the group hydroxymethyl, and a hydrophobic substituent which comprises a fluorine-containing alkyl radical containing 3 to 24, the fluorine content being 0.05 to 5% by weight, based on the dry weight of the cellulose ether.

* * * * *